United States Patent [19]

Brembilla

[11] Patent Number: 5,044,145
[45] Date of Patent: Sep. 3, 1991

[54] FILM PACKAGING

[75] Inventor: Sandro Brembilla, Arese Milano, Italy

[73] Assignee: W. R. Grace & Co.-Conn., Duncan, S.C.

[21] Appl. No.: 455,462

[22] Filed: Dec. 22, 1989

[30] Foreign Application Priority Data

Mar. 23, 1989 [GB] United Kingdom ............... 8906713

[51] Int. Cl.$^5$ .................. B65B 7/28; B65B 47/02; B65B 51/20
[52] U.S. Cl. ............................ 53/478; 53/329.4; 53/373.8; 53/373.9; 53/553; 493/134
[58] Field of Search ............ 53/479, 478, 477, 442, 53/450, 427, 509, 557, 553, 373, 373.7, 373.8, 373.9, 329.2, 329.3, 329.4, 374.5, 375.4

[56] References Cited

U.S. PATENT DOCUMENTS

| | | | |
|---|---|---|---|
| 3,508,376 | 4/1970 | Bemiss | 53/478 |
| 3,645,825 | 2/1972 | Gaunt et al. | 53/478 X |
| 3,874,145 | 4/1975 | Schmidt | 53/112 |
| 4,133,163 | 1/1979 | Wilson | 53/52 |
| 4,626,234 | 12/1986 | Oxborrow | 493/134 X |
| 4,864,802 | 9/1989 | D'Angelo | 53/373 X |

FOREIGN PATENT DOCUMENTS 0270208 8/1988 European Pat. Off. .
0864090 3/1961 United Kingdom .
1435562 5/1976 United Kingdom .
1451662 10/1976 United Kingdom .

Primary Examiner—James F. Coan
Attorney, Agent, or Firm—John J. Toney; William D. Lee, Jr.; Leigh P. Gregory

[57] ABSTRACT

Packaging apparatus, using an upper film (6) pre-heated before contact with a lower film (9) on which products (not shown) are placed, has at least the central region heated by radiant heaters (7) and the marginal regions heated by hot air nozzles (10) at least in the region immediately preceding contact (8) between the upper and lower films.

10 Claims, 2 Drawing Sheets

FILM PACKAGING

The present invention relates to a packaging process and apparatus in which one or more articles can be placed between opposing film sheets which are sealed together, and often vacuum draped or shrunk into intimate contact with the enclosed article(s).

In known forms of such apparatus a base film, which may or may not be thermoformed into a succession of trays, is advanced along a packaging table and the articles are then placed on that film and subsequently covered by a second flexible packaging film which descends into contact with the base film and the articles thereon in order to become sealed where the two films come in contact with one another hence enclosing completely the articles which may either be arranged as a succession of individual articles or as a succession of groups of articles which are intended to form a package comprising a respective said group.

One example of such an apparatus is disclosed in EP-A-0270208 in which FIG. 1 shows the base film being unwound at one end of the packaging table and thermoformed into trays, following which the cover film is paid out from a downstream overhead roll and is brought into contact with the articles on the base film.

The present invention is particularly concerned with such an apparatus in which the cover film is pre-heated before coming into contact with the base film.

It has been known to pre-heat the cover film before contacting it with the base film, for example by feeding the cover film past an array of heat-emitting lamps.

There are circumstances when this heating is not fully effective. For example, when packaging a tall product which has to pass below all of the heat-emitting lamps, and be sufficiently below them to avoid damage due to exposure to their radiant heat, the last lamps nearest the point of juxtaposition of the cover film with the base must be positioned a long way ahead of the sealing location giving the cover film time to cool down before sealing. This cooling is all the more noticeable along the margins of the cover film where the clamps advancing the cover film tend to be relatively cool and serve to absorb heat from the margins of the cover film. There is thus a tendency for at least the marginal seals to be weak and possibly also for the ends of the transverse seal lines to be insufficiently hot at the time of sealing so the leading corners of the package are inadequately sealed.

Accordingly, one aspect of the present invention proposes apparatus for packaging products in film, comprising means for contacting first and second films with at least one product therebetween, radiant heating means for heating said first film before contact with said second film, and further heating means for applying heat, independently of said radiant heating means by contact of a heat transfer medium with at least the marginal regions of said first film.

A second aspect of the present invention proposes a process for packaging articles between heat sealable thermoplastic films, comprising introducing product articles between first and second films, heating said first film by radiant heating means across at least the majority of said first film extending outwardly from a centre line of the first film, independently heating the marginal regions of said first film by contact with a heat transfer medium, and contacting said first and second films with the product therebetween to seal the pre-heated first film to the second film.

In order that the present invention may more readily be understood the following description is given, merely by way of example, with reference to the accompanying drawings in which.

Figure 1:
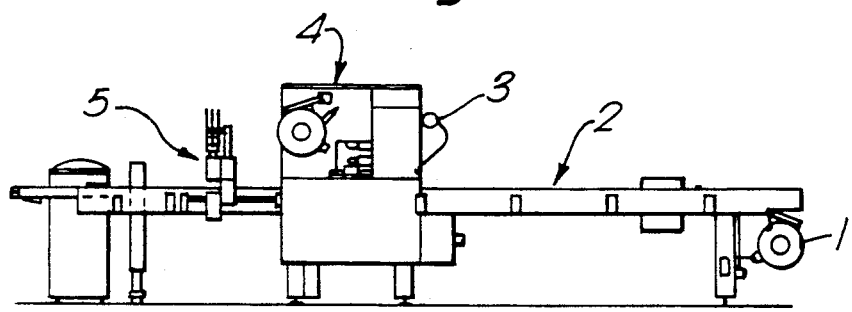
FIG. 1 is a side view showing the overall machine in accordance with the present invention.

FIG. 1 shows a side elevational view of a machine capable of dispensing a lower polyethylene film (9 in FIG. 2) from a supply roll 1 and feeding it along a table 2 where products (not shown) can be placed on the film by non-illustrated means, following which the products and the lower film are covered by an upper polyethylene film (6 in FIG. 2) from a supply roll 3. The two films 6 and 9, with the products between them, then pass through a sealing station 4 where the upper and lower films are sealed to one another, and subsequently the thus formed packs are severed from one another at a severing station 5.

The region directly below the supply roll 3 of the covering film is shown in more detail in FIG. 2 where the covering film 6 is illustrated as being guided, by means not shown, past a battery of infra-red heater elements 7 for pre-heating the film in a known manner before it arrives at the point of contact 8 with the lower film 9 having the product (not shown) thereon.

Over the last part of the travel of the upper film 6 toward the line of contact 8, the marginal edges of that film pass directly below elongate nozzles 10 through which hot air is injected to be dispensed directly above and in contact with the corner region where the margins 11 of the upper film 6 intersect the line of contact 8 between the upper and lower films 6 and 9, respectively.

To some extent the film region passing alongside the elongate nozzle 10 may be heated by radiation at a low rate from the nozzle and hence there is a two-stage heating process which is concluded when the hot air issuing from the nozzles 10 contacts the upper face of the upper film 6. This second, independent heating action is sufficient to ensure that the contact between the upper and lower films is adequate to seal the heated upper film 6 to the lower film 9 completely over the whole of its width and hence no unsealed areas such as areas 12 in FIG. 4 will arise.

Figure 2:
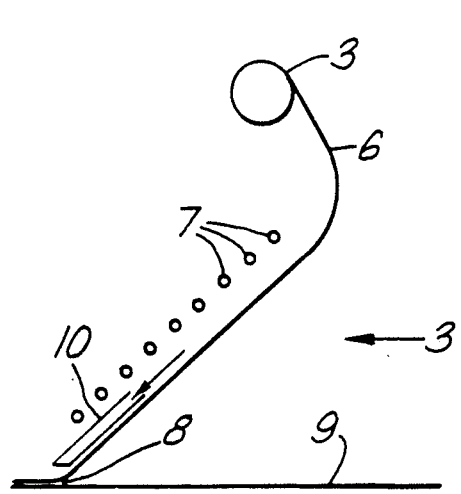
FIG. 2 is a detail showing the path of the cover film as it approaches the base film near the sealing station.
Figure 3:
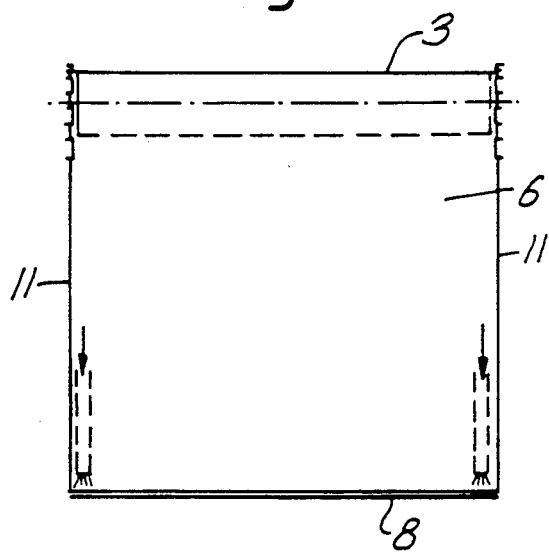
FIG. 3 is a view of the apparatus and film of FIG. 2 when seen along the direction of arrow 3 thereof.
Figure 4:
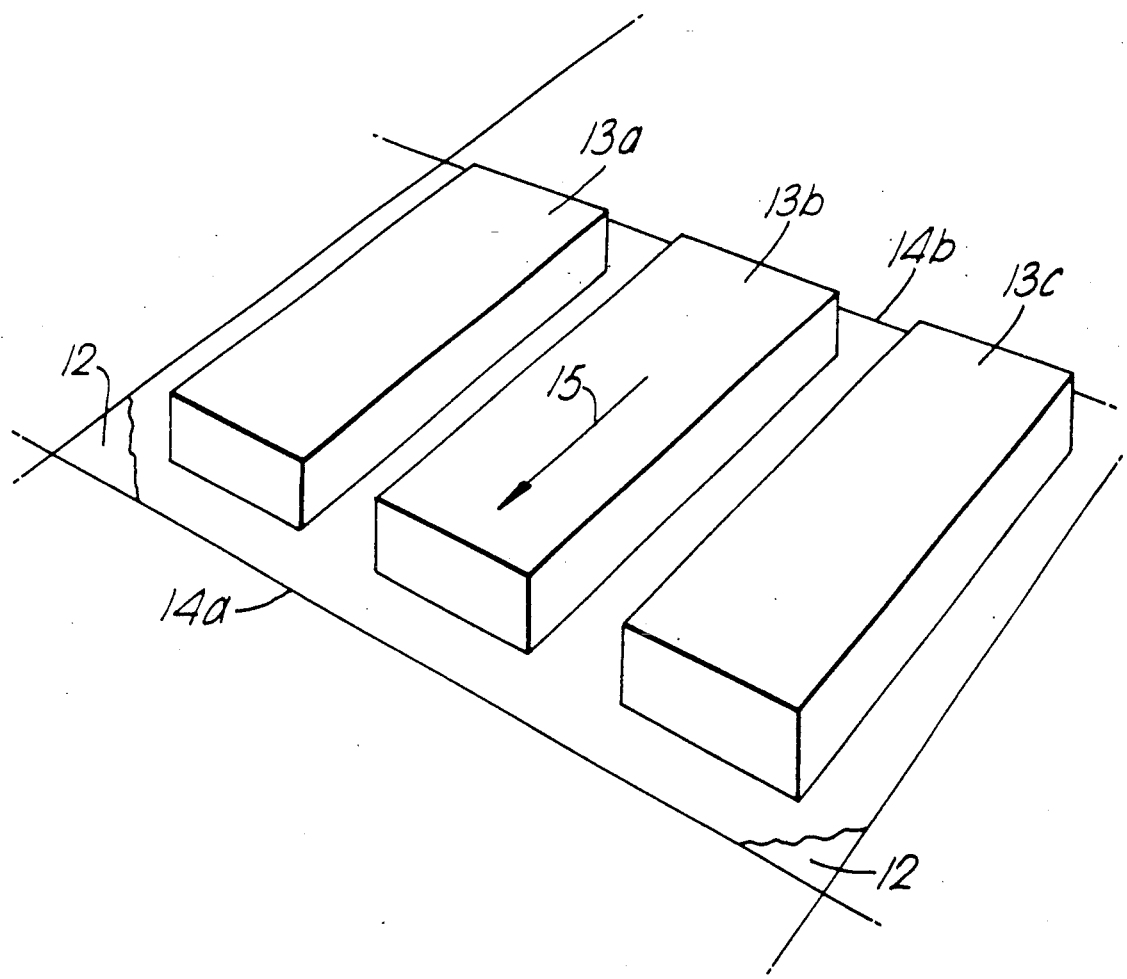
FIG. 4 is a detail of one row of packages being formed using the apparatus in accordance with the present invention, and illustrating the potential areas of weak seal which have been eliminated by use of the present invention.

Although the products are omitted from FIGS. 1 and 2, a typical array of three products 13a, 13b and 13c is shown in FIG. 4 which also defines the leading edge 14a and the trailing edge 14b of a pack (the pack itself being defined once the film assemblies have passed through the severing station 5 of FIG. 1).

The direction of movement of the products and films in FIG. 4 is illustrated by the arrow 15.

As will be evident from the above description, the use of the infra-red heating lamps 7 to pre-heat the film 6 is well known but has been found to be in some circumstances unsatisfactory as regards the heating of the margins 11 of the upper film 3, partly because of the limited extent of the lamps 7 across the width of the cover film 6, partly because of the need for the marginal regions 11 of the upper film 6 to be held by movable clamping means which conceal the film from the heat radiation in order for that holding action to guard against contact of the film 6 with the radiant heaters 7, partly due to the loss of heat by conduction to the conveyor clamps, and partly due to the fact that there is a long run of the cover film between the last heat-emitting lamps and the sealing means during which the pre-heated cover film tends to cool down. For example, whereas most of the cover film may be pre-heated to the level of 100° C. to 110° C. required for good sealing, the margins may only be in the range 80° C. to 90° C. in the absence of the hot air nozzles. The air from the nozzles 10 brings the temperature of the margins up to 100° C. to 110° C.

As indicated above, the application of air heating near the line of contact 8 is adequate to overcome the deleterious effects on the seal, resulting from the lower temperature of the marginal areas of the upper film 6.

If these unsealed corner regions are left in the finished pack, there may be a loss of vacuum experienced in cases where the space immediately around the products 13a, 13b and 13c and between the films 6 and 9 is intended to be evacuated in an airtight manner in the package.

As indicated above, although the present invention is intended to have primary application in the type of process where the lower film is flat and the products stand proud of it, it can equally apply to cases where the lower film is thermoformed into usually shallow trays, and the covering film is intended to drape onto both the tops of the articles and the bases of the trays.

The process and apparatus of the present invention are particularly useful in the formation of packages using a multi-layer film which may, for example, have a thickness in the range 75 μm to 150 μm. One such film is an oxygen barrier film incorporating a barrier layer of EVOH and known by the Registered Trade Mark "DARFRESH".

I claim:

1. Apparatus for packaging products in film, comprising means for contacting first and second films with at least one produce therebetween, radiant hating means for heating said first film before contact with said second film, and further heating means for applying heat, independently of said radiant heating means by contact of a heat transfer medium with portions of said first film not adequately heated by said radiant heating means including at least the marginal regions of said second film.

2. Apparatus according to claim 1, wherein said further heating means comprise means for contacting said first film with hot air.

3. Apparatus according to claim 1 or claim 2, wherein said further heating means is operative on the first film after it has been heated by said radiant heating means.

4. A process for packaging articles between heat sealable thermoplastic films, comprising introducing product articles between first and second films, heating said first film by radiant heating means across at least the majority of said first film extending outwardly from a centre line of the first film, independently heating portions of said first film not adequately heated by said radiant heating means including the marginal regions of said first film by contact with a heat transfer medium, and subsequently contacting said first and second films with the product therebetween to seal the preheated first film to the second film.

5. A process according to claim 4, wherein the independent heating is by way of contact with hot air.

6. A process according to claim 4 or claim 5, wherein said radiant heating is infra-red heating.

7. A process according to claim 4 wherein said heat sealable film is polyethylene.

8. A process according to claim 6 wherein said heat sealable film is polyethylene.

9. A process for packaging articles between first and second heat sealable films, comprising:
   introducing product articles between first and second films;
   preheating a majority of said first film by radiant heating means;
   contacting said first and second films with the product therebetween to substantially seal said preheated first film to said second film; and
   further heating portions of said first film inadequately heated by said radiant heating means including marginal areas of said first film immediately prior to and upon contact of said first film with said second film to completely seal said first film including said marginal areas thereof to said second film.

10. Apparatus for packaging products between first and second heat sealable films, comprising:
    heating means for heating said first film prior to contact with said second film, said heating means comprising a radiant heating means and a further heating means for heating portions of said first film inadequately heated by said radiant heating means including marginal regions of said first film; and
    means for contacting said first and second films with the product therebetween to seal the preheated first film to the second film.

* * * * *

UNITED STATES PATENT AND TRADEMARK OFFICE
CERTIFICATE OF CORRECTION

PATENT NO. : 5,044,145

DATED : September 3, 1991

INVENTOR(S) : Sandro Brembilla

It is certified that error appears in the above-identified patent and that said Letters Patent is hereby corrected as shown below:

In column 3, line 46 of the claims, delete the word "produce" substituting therefor --product--. Also, delete the word "hating" substituting therefor --heating--.

Signed and Sealed this

Ninth Day of February, 1993

Attest:

STEPHEN G. KUNIN

*Attesting Officer*     Acting Commissioner of Patents and Trademarks